US 9,916,524 B2

(12) United States Patent
Fanello et al.

(10) Patent No.: US 9,916,524 B2
(45) Date of Patent: Mar. 13, 2018

(54) DETERMINING DEPTH FROM STRUCTURED LIGHT USING TRAINED CLASSIFIERS

(71) Applicant: Microsoft Technology Licensing, LLC, Redmond, WA (US)

(72) Inventors: Sean Ryan Francesco Fanello, Bellevue, WA (US); Christoph Rhemann, Bellevue, WA (US); Adarsh Prakash Murthy Kowdle, Redmond, WA (US); Vladimir Tankovich, Bellevue, WA (US); David Kim, Bellevue, WA (US); Shahram Izadi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 15/071,133

(22) Filed: Mar. 15, 2016

(65) Prior Publication Data
US 2017/0236286 A1    Aug. 17, 2017

Related U.S. Application Data

(60) Provisional application No. 62/296,495, filed on Feb. 17, 2016.

(51) Int. Cl.
*G06K 9/00* (2006.01)
*G06K 9/62* (2006.01)
(Continued)

(52) U.S. Cl.
CPC ........... *G06K 9/6282* (2013.01); *G06K 9/627* (2013.01); *G06T 7/0057* (2013.01); *G06T 7/521* (2017.01);
(Continued)

(58) Field of Classification Search
CPC ..... G06T 7/0057; G06K 9/627; G06K 9/6282
See application file for complete search history.

(56) References Cited

U.S. PATENT DOCUMENTS 7,561,732 B1    7/2009 Owechko et al.
8,150,142 B2    4/2012 Freedman et al.
(Continued)

FOREIGN PATENT DOCUMENTS

EP    2843621 A1    3/2015

OTHER PUBLICATIONS

"ATOS—Industrial 3D Scanning Technology" Retrieved on Jan. 4, 2016, Available at: http://www.gom.com/metrology-systems/3d-scanner.html, 2 pages.
(Continued)

*Primary Examiner* — Gregory M Desire
(74) *Attorney, Agent, or Firm* — Drinker Biddle & Reath LLP

(57) ABSTRACT

Techniques for determining depth for a visual content item using machine-learning classifiers include obtaining a visual content item of a reference light pattern projected onto an object, and determining shifts in locations of pixels relative to other pixels representing the reference light pattern. Disparity, and thus depth, for pixels may be determined by executing one or more classifiers trained to identify disparity for pixels based on the shifts in locations of the pixels relative to other pixels of a visual content item depicting in the reference light pattern. Disparity for pixels may be determined using a visual content item of a reference light pattern projected onto an object without having to match pixels between two visual content items, such as a reference light pattern and a captured visual content item.

20 Claims, 6 Drawing Sheets

(51) Int. Cl.
  *G06T 7/00* (2017.01)
  *G06T 7/521* (2017.01)
(52) U.S. Cl.
  CPC .............. *G06T 2207/10028* (2013.01); *G06T 2207/20081* (2013.01)

(56) References Cited

U.S. PATENT DOCUMENTS

| | | | |
|---|---|---|---|
| 8,351,688 B2* | 1/2013 | Hancock | G06K 9/6292 382/159 |
| 8,744,172 B2 | 6/2014 | Tsymbal et al. | |
| 9,025,863 B2 | 5/2015 | Reif | |
| 9,098,908 B2 | 8/2015 | Kirk et al. | |
| 9,208,547 B2 | 12/2015 | Cohen et al. | |
| 9,712,806 B2* | 7/2017 | Olmstead | H04N 13/0239 |
| 2004/0037450 A1 | 2/2004 | Bradski | |
| 2005/0185841 A1* | 8/2005 | Tyan | G06F 17/30253 382/181 |
| 2014/0122381 A1 | 5/2014 | Nowozin | |
| 2014/0241612 A1 | 8/2014 | Rhemann et al. | |
| 2015/0002628 A1 | 1/2015 | Reif | |
| 2015/0138078 A1 | 5/2015 | Krupka et al. | |
| 2015/0235109 A1* | 8/2015 | Yoshii | G06K 9/6255 382/159 |
| 2015/0242709 A1* | 8/2015 | Pham | G06K 9/6226 382/160 |
| 2015/0243031 A1 | 8/2015 | Narasimha et al. | |
| 2015/0248764 A1 | 9/2015 | Keskin et al. | |
| 2015/0371394 A1 | 12/2015 | Visentini et al. | |
| 2016/0188995 A1* | 6/2016 | Somanath | H04N 13/0242 382/203 |

OTHER PUBLICATIONS

Barnes et al. "PatchMatch: A Randomized Correspondence Algorithm for Structural Image Editing," In Journal of ACM Transactions on Graphics, vol. 28, Issue 3, Aug. 2009, 12 pages.
Batlle et al., "Recent Progress in Coded Structured Light as a Technique to Solve the Correspondence Problem: A Survey," In Journal of Pattern Recognition, vol. 31, Issue 7, Jul. 31, 1998, pp. 963-982.
Besl, Paul J., "Active, Optical Range Imaging Sensors," In Journal of Machine Vision and Applications, vol. 1, Issue 2, Jun. 1988, pp. 127-152.
Bleyer et al., "PatchMatch Stereo—Stereo Matching with Slanted Support Windows," In Proceedings of British Machine Vision Conference, Sep. 2011, pp. 1-11.
Bleyer et al., "Simple but Effective Tree Structures for Dynamic Programming-based Stereo Matching," In Proceedings of 3rd International Conference on Computer Vision Theory and Applications, Jan. 22, 2008, pp. 415-422.
Bleyer et al., "Stereo Matching-State-of-the-Art and Research Challenges," In Publication of Springer London—Advanced Topics in Computer Vision, Jan. 2013, pp. 1-35.
Davis et al., "Spacetime Stereo: A Unifying Framework for Depth from Triangulation," In Proceedings of IEEE Computer Society Conference on Computer Vision and Pattern Recognition, vol. 2, Jun. 16, 2003, 8 pages.
De-Maeztu et al., "Linear Stereo Matching," In Proceedings of 13th International Conference on Computer Vision, Nov. 6, 2011, 8 pages.
Eigen et al., "Depth Map Prediction from a Single Image using a Multi-Scale Deep Network," In Proceedings of Annual Conference on Neural Information Processing Systems, Dec. 8, 2014, pp. 1-9.
Ernst et al., "Mutual Information based Semi-Global Stereo Matching on the GPU," In Proceedings of 4th International Symposium on Visual Computing, Dec. 1, 2008, pp. 1-11.
Fanelli et al., "Real Time Head Pose Estimation with Random Regression Forests," In Proceedings of IEEE Conference on Computer Vision and Pattern Recognition, Jun. 20, 2011, pp. 617-624.

Fanello et al., "Learning to be a Depth Camera for Close-Range Human Capture and Interaction," In Journal of ACM Transactions on Graphics, vol. 33, Issue 4, Jul. 2014, 11 pages.
Geiger et al., "Efficient Large-Scale Stereo Matching," In Proceedings of 10th Asian Conference on Computer Vision, Nov. 8, 2010, pp. 1-14.
Geng, Jason, "Structured-light 3D surface imaging: a tutorial," In Journal of Advances in Optics and Photonics vol. 3, Issue 2, Mar. 31, 2011, pp. 128-160.
Hansard et al., "Time-of-flight cameras: principles, methods and applications" In Publication Springer Science & Business Media, Nov. 2012, 103 pages.
Hirschmuller, Heiko, "Stereo Processing by Semiglobal Matching and Mutual Information," In Proceedings of IEEE Transactions on Pattern Analysis and Machine Intelligence, vol. 30, Issue 2, Feb. 2008, pp. 328-341. 14 pages.
Horn et al., "Toward optimal structured light patterns," In Journal Image and Vision Computing, vol. 17, No. 2, Feb. 1999, pp. 1-26.
Ishii et al., "High-speed 3D image acquisition using coded structured light projection," In Proceedings of the IEEE/RSJ International Conference on Intelligent Robots and Systems, Oct. 29, 2007, pp. 925-930. 6 page.
Izadi et al., "KinectFusion: Real-time 3D reconstruction and interaction using a moving depth camera," In Proceedings of the 24th annual ACM symposium on User interface software and technology, Oct. 16, 2011, pp. 559-568. 10 pages.
Ju et al., "Constant time stereo matching," In Proceedings of 13th International Machine Vision and Image Processing Conference, Sep. 2, 2009, pp. 13-17.
Konolige, Kurt, "Projected Texture Stereo," In Proceedings of IEEE International Conference on Robotics and Automation, May 3, 2010, pp. 148-155.
Lu et al., "Patch match filter: Efficient edge-aware filtering meets randomized search for fast correspondence field estimation," In Proceedings of IEEE Conference on Computer Vision and Pattern Recognition, Jun. 23, 2013, pp. 1854-1861.
Martinez et al., "Kinect unleashed: getting control over high resolution depth maps," In Proceedings of 13th IAPR Conference on Machine Vision Applications, May 2013, 4 pages.
Maruyama et al., "Range sensing by projecting multiple slits with random cuts," In Proceedings of IEEE Transactions on Pattern Analysis and Machine Intelligence, vol. 15, Issue 6, Jun. 1993, pp. 647-651.
Mattoccia, Stefano, "Stereo Vision Algorithms for FPGAs," In Proceedings of IEEE Conference on Computer Vision and Pattern Recognition Workshops, Jun. 23, 2013, pp. 636-641.
McIlroy et al., "Kinectrack: 3D pose estimation using a projected dense dot pattern," In Proceedings of IEEE Transactions on Visualization and Computer Graphics, vol. 30, Issue 6, Jun. 2014, 7 pages.
McIlroy, "Kinectrack: Agile 6-DoF Tracking Using a Projected Dot Pattern," In Proceedings of IEEE International Symposium on Mixed and Augmented Reality (ISMAR), Nov. 2012, pp. 1-7.
Michael et al., "Realtime Stereo Vision: Optimizing Semi-Global Matching," In Proceedings of Intelligent Vehicles Symposium, Jun. 23, 2013, 7 pages.
Min et al., "A revisit to cost aggregation in stereo matching: How far can we reduce its computational redundancy?" In Proceedings of IEEE International Conference on Computer Vision, Nov. 6, 2011, pp. 1567-1574.
Moigne et al., "Structured light patterns for robot mobility," In IEEE Journal of Robotics and Automation, vol. 4, Issue 5, Oct. 1988, pp. 541-548.
Nguyen et al., "Modeling kinect sensor noise for improved 3d reconstruction and tracking," In Proceedings of the Second International Conference on 3D Imaging, Modeling, Processing, Visualization & Transmission, Oct. 13, 2012, pp. 524-530.
Nishihara, H. K., "Prism: A practical real-time imaging stereo matcher," In MIT A.I. Memo No. 780, May 1984, 32 pages.
Papadimitriou et al., "An FPGA-based real-time system for 3D stereo matching, combining absolute differences and census with aggregation and belief propagation," In Proceedings of 21st IFIP

(56) References Cited

OTHER PUBLICATIONS

WG 10.5/IEEE International Conference on Very Large Scale Integration, Oct. 6, 2013, 21 pages.
Posdamer et al., "Surface measurement by space-encoded projected beam systems," In Journal Computer Graphics and Image Processing, vol. 18, Issue 1, Jan. 1982. pp. 1-17.
Pradeep et al., "MonoFusion: Real-time 3D Reconstruction of Small Scenes with a Single Web Camera," In IEEE International Symposium on Mixed and Augmented Reality, Oct. 1, 2013, pp. 83-88.
Rhemann et al., "Fast cost-volume filtering for visual correspondence and beyond," In IEEE Computer Vision and Pattern Recognition, Jun. 2011, pp. 3017-3024.
Richardt et al., "Real-time spatiotemporal stereo matching using the dual-cross-bilateral grid," In Proceedings of European Conference on Computer Vision, Sep. 5, 2010, 14 pages.
Salvi et al., "A state of the art in structured light patterns for surface profilometry," In Journal Pattern Recognition, vol. 43, Issue 8, Aug. 2010, 36 pages.
Salvi et al., "Pattern codification strategies in structured light systems," In Journal Pattern Recognition, vol. 37, Issue 4, Apr. 2004, 827-849.
Sang et al., "Improving Semantic Texton Forests with a Markov Random Field for Image Segmentation," In Proceedings of Fifth Symposium on Information and Communication Technology, Dec. 4, 2014, pp. 162-170.
Saxena et al., "Make3D: Learning 3D Scene Structure from a Single Still Image," In Journal of IEEE Transactions on Pattern Analysis and Machine Intelligence, vol. 31, Issue 5, May 2009, pp. 824-840.
Scharstein et al., "A Taxonomy and Evaluation of Dense Two-Frame Stereo Correspondence Algorithms," In Journal of International Journal of Computer Vision, vol. 47, Issue 1-3, Apr. 2002, pp. 1-35.
Shotton et al., "Real-Time Human Pose Recognition in Parts from Single Depth Images," In Proceedings of IEEE Conference on Computer Vision and Pattern Recognition, Jun. 20, 2011, 8 pages.
Shotton et al., "Real-Time Human Pose Recognition in Parts from Single Depth Images," In Proceedings of the 24th IEEE Conference on Computer Vision and Pattern Recognition, Jun. 20, 2011, pp. 1-8.
Tan et al., "Learning Graphical Models for Hypothesis Testing and Classification," In Journal of IEEE Transactions on Signal Processing, vol. 58, No. 11, Nov. 2010, pp. 5481-5495.
Vuylsteke et al., "Range Image Acquisition with a Single Binary-Encoded Light Pattern," In Journal of IEEE Transactions on Pattern Analysis and Machine Intelligence, vol. 12 Issue 2, Feb. 1990, pp. 148-164.
Wei et al., "Spectral-Spatial Classification of Hyperspectral Imagery based on Random Forests," In Proceedings of Fifth International Conference on Internet Multimedia Computing and Service, Aug. 17, 2013, pp. 163-168.
Will et al., "Grid Coding: A Preprocessing Technique for Robot and Machine Vision," In Journal of Artificial Intelligence, vol. 2, Issue 3-4, Dec. 1971, 5 pages.
Yang et al., "A Constant-Space Belief Propagation Algorithm for Stereo Matching," In Proceedings of IEEE Conference on Computer Vision and Pattern Recognition, Jun. 13, 2010, pp. 1458-1465.
Yang, Qingxiong, "Stereo Matching Using Tree Filtering," In Proceedings of IEEE Transactions on Pattern Analysis and Machine, Apr. 2015, 834-846.
Zbontar et al., "Computing the Stereo Matching Cost with a Convolutional Neural Network," In Proceedings of IEEE Conference on Computer Vision and Pattern Recognition, Jun. 7, 2015, 8 pages.
Zhang et al., "Joint Integral Histograms and its Application in Stereo Matching," In Proceedings of 17th IEEE International Conference on Image Processing, Sep. 26, 2010, pp. 817-820.
Zhang et al., "Rapid Shape Acquisition Using Color Structured Light and Multi-Pass Dynamic Programming," In Proceedings of 1st International Symposium on 3D Data Processing Visualization and Transmission, Jun. 19, 2002, pp. 1-13.
Zhang, Song, "Recent Progresses on Real-Time 3D Shape Measurement Using Digital Fringe Projection Techniques," In Journal of Optics and lasers in engineering, vol. 48, Issue 2, Feb. 2010, 1 page.
Zhang et al., "Spacetime Stereo: Shape Recovery for Dynamic Scenes," In Proceedings of IEEE Computer Society Conference on Computer Vision and Pattern Recognition, vol. 2, Jun. 16, 2003, pp. 1-8.
Zollhofer et al., "Real-time Non-rigid Reconstruction using an RGB-D Camera," In Journal of ACM Transactions on Graphics, vol. 33, Issue 4, Jul. 2014, 12 pages.
Gall, et al., "An Introduction to Random Forests for Multi-class Object Detection", Jun. 26, 2011, Outdoor and Large Scale Real World Scene Analysis, Springer Berlin Heidelberg, Berlin, pp. 243-263.
PCT ISR/WO for Application No. PCT/US2017/017081, dated Apr. 19, 2017. 16 pages.

* cited by examiner

DETERMINING DEPTH FROM STRUCTURED LIGHT USING TRAINED CLASSIFIERS

RELATED APPLICATIONS

This application is a non-provisional of and claims the benefit of U.S. Provisional Application 62/296,495, filed on Feb. 17, 2016, which is incorporated by reference herein.

BACKGROUND

As consumer computing devices continue to evolve, depth camera systems are increasingly being included in these devices to provide additional versatility and enjoyment for consumers. Depth camera systems, such as structured light systems (including a camera and a projector), utilize stereo matching techniques to triangulate depth in visual content items by solving a correspondence between pixels in a visual content item observed by the camera and pixels representing reference light patterns projected by the projector. For instance, patches of pixels in a visual content item observed by the camera can be matched to corresponding pixels in a visual content item representing the reference light pattern projected by the projector. Depth can be derived for each corresponding pixel based on triangulation and epipolar geometric relationships between the matched pixels. While more efficient processing techniques are continually being implemented for matching pixels, depth camera systems suffer from high computational costs associated with matching pixels between the camera and projector.

SUMMARY

This disclosure describes techniques for determining depth for visual content items using machine-learning classifiers. Techniques described herein determine depth without matching and/or accessing a corresponding reference light pattern or visual content item. The techniques described herein include accessing a visual content item comprising a plurality of visual content item elements representing a reference light pattern associated with an object. Techniques can further include identifying a visual content item element, and identifying a position of the visual content item relative to a group of visual content items. Moreover, techniques described herein can include determining, by executing one or more classifiers, the disparity for the visual content item element based at least in part on the position. In some examples, depth for a pixel can be determined based on an inversely proportional relationship with disparity determined for the pixel. For instance, depth can be calculated based on disparity for a pixel, a baseline between a visual content item capturing device and a projector, and a focal length associated with the visual content item capturing device.

Additionally, the techniques described herein include obtaining training data to train classifiers to map pixels to labels that can be used to determine disparity. Techniques described herein include obtaining training data comprising content items associated with ground truth labels for pixel shifts of pixels representing a reference light pattern in visual content items caused by projecting a reference light pattern onto an object. In an example, the classifiers can include a decision tree. The decision tree can include a root, a plurality of nodes arranged in a cascading formation, and a plurality of leaf nodes. In some examples, techniques for training the decision tree can include selecting candidate split function parameters for each node, and inputting the training data into the root of the decision tree. Techniques can further include causing the training data to move through the plurality of nodes such that the split functions of the nodes evaluate the training data based at least in part on the candidate split functions. Even further, techniques can include determining, by executing an objective function, optimal split function parameters for each of the plurality of nodes based at least in part on the training data being moved through the plurality of nodes.

The techniques described herein affect computer operations in various ways. By utilizing machine-learning classifiers to map pixel shifts to labels from which disparities, and accordingly depth are determined, the matching of pixels between visual content items performed in existing stereo matching algorithms is no longer necessary. No matching between two visual content items and/or access to a second visual content item, is necessary using the machine-trained classifiers described herein. Accordingly, the techniques described herein can conserve computing resources and reduce computational costs associated with depth determination.

This Summary is provided to introduce a selection of techniques in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
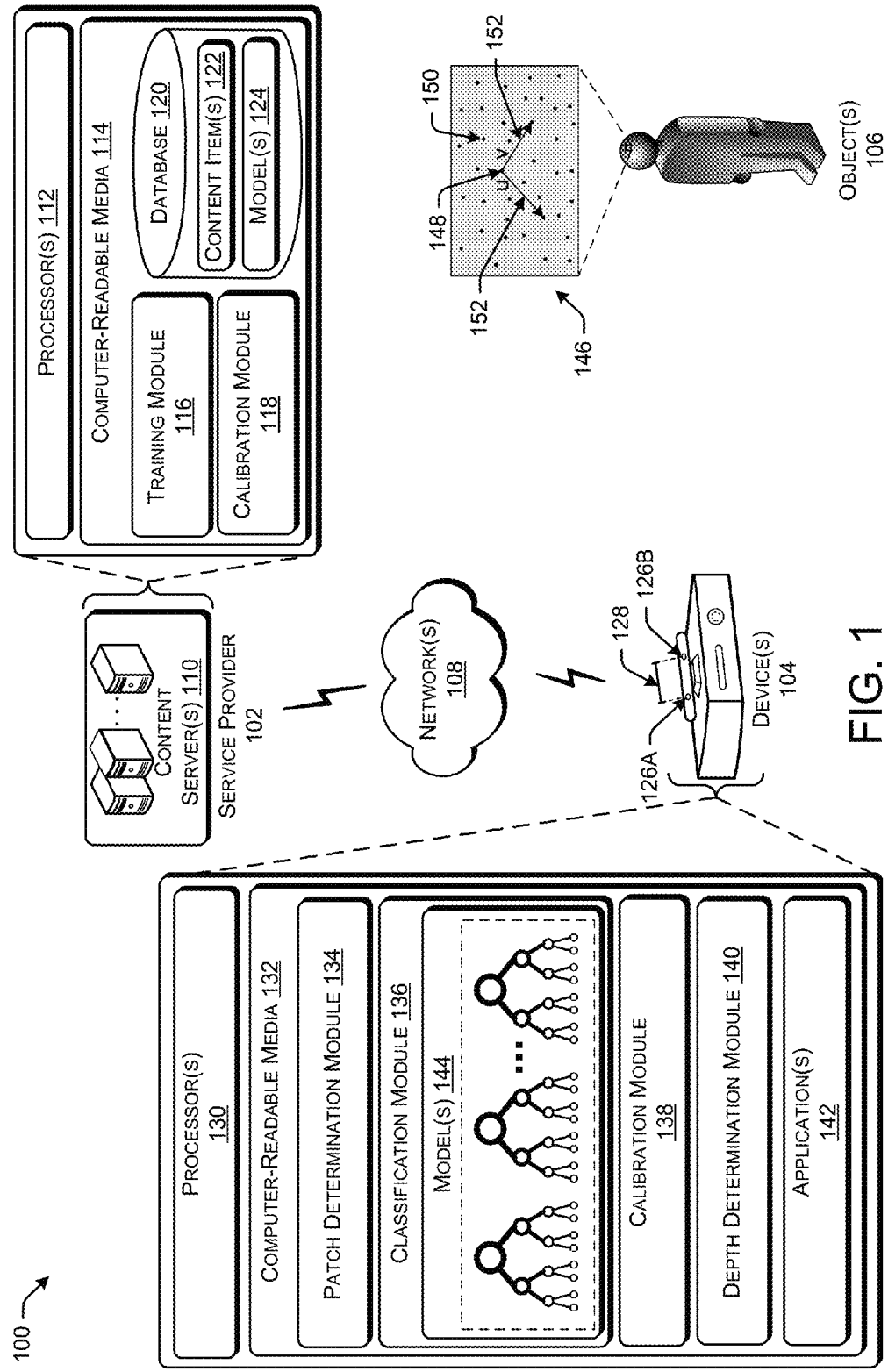
FIG. 1 is a schematic diagram showing an example environment for using machine-learning classifiers to determine depths for pixels in a visual content item depicting an object.

This disclosure describes using machine-learning classifiers to determine depth for objects in a visual content item (e.g., image, video, etc.) without performing matching between pixels in the visual content item and pixels in a reference light pattern, or another visual content item. A model trained to classify pixel shifts (i.e., a classifier) can access a visual content item depicting an object with the reference light pattern projected thereon and, based at least in part on shifts in positions of pixels in the visual content item representing the reference light pattern caused by the object, determine depth for the object. For instance, a change in a position of a pixel relative to other pixels in the visual content item can be determined, and the model can identify a label for an area of the visual content item corresponding to the pixel based on ground truth labels learned by the model.

In various examples, one or more models can be trained using machine-learning techniques to classify pixels for determining disparity. A model can be a classifier (e.g., decision forests, neural networks, deep learning neural networks, adaptive boosting, etc.), which can be trained using machine-learning techniques to map pixel shifts to labels that can be leveraged to determine disparity. As described in further detail below, in at least one example, a model can be a decision forest including a root, a cascading arrangement of hierarchal layers of branch nodes, and leaf nodes. A particular pixel can move through the model based at least in part on the attributes of the location of the particular pixel relative to the other pixels. For instance, each branch node can comprise a split function which determines a flow path of the particular pixel based on the attributes. The leaf nodes can correspond to labels such that, once the particular pixel has moved through the cascading arrangement of branch nodes, the resulting leaf node to which the particular pixel was mapped to can identify a label for the particular pixel. In this way, the shift in location of the particular pixel representing the reference light pattern in the visual content item caused by projecting the reference light pattern onto the object can be used to determine disparity for the pixel, which is in turn can be used to calculate depth.

As noted above, the one or more models can be trained using machine-learning techniques. For instance, the one or more models can be trained to map a pixel to a label for determining disparity. The one or more models can be trained by machine-learning algorithms using training data. The training data can include visual content items which have been processed using accurate stereo matching algorithms to determine labels for pixel shifts identified in the visual content items. The stereo matching algorithms can compute depth maps for the visual content items that are used as ground truth disparities for training the classifiers. As discussed in more detail below, the training data can be leveraged to train the one or more models. In at least one example, the one or more models can include decision forests, and training the one or more models can include utilizing functions to identify optimal split function parameters for the split function associated with each node of a decision tree in a decision forest. In such examples, the ground truth disparities can be used to train the decision forests to map pixels to an appropriate label based on shifts identified for the pixel.

The techniques described herein affect computer operations in various ways. As noted above, existing structured light systems triangulate depth by solving a correspondence problem between pixels in a visual content item captured by a camera and a reference light pattern projected by a projector. However, matching of pixels between visual content items is computationally intensive, leading to high processing requirements for processors of computing devices, as well as reduced depth accuracy and framerate. By utilizing machine-learning classifiers to map pixel shifts to labels from which disparities, and accordingly depth are determined, the matching of pixels between visual content items performed in existing stereo matching algorithms is no longer necessary. No matching between two visual content items and/or access to a second visual content item, is necessary using the machine-trained classifiers described herein.

Furthermore, in some examples individual scanlines associated with visual content items can be scanned and analyzed individually, as described below. For the purposes of this discussion, a scanline is a row of pixels in a visual content item. A visual content item includes a plurality of scanlines. By utilizing one classifier per scanline, parallel processing of scanlines can be performed, which can in turn result in faster processing speeds for determining depth for visual content items. As such, techniques for determining depth in a visual content item described herein reduce the high processing requirements for processors of computing devices. Moreover, the use of machine-trained classifiers can create high resolution real-time depth maps that surpass the quality of existing depth technologies.

While the techniques described herein are with reference to determining disparity for a pixel, in some examples the techniques can be utilized to determine other properties of an object with a reference pattern projected thereon. For instance, the classifiers may further identify properties of an object, such as reflectivity of a material of the object, textures of the material of the object, etc. In at least one example, to accomplish this, texture and reflectivity of materials included in the visual content items of in the training data may be identified as ground truth texture and reflectivity. In some examples, the texture and reflectivity of a visual content item may be associated with characteristics of pixel shifts in positions of pixels of a visual content item representing a reference light pattern. The classifiers may then be trained to identify materials of a particular texture or reflectivity based on the learned characteristics. As such, the classifiers may further identify reflectivity and texture properties of material of an object in a visual content item.

Illustrative Environments

FIG. 1 is a schematic diagram showing an example environment 100 for using machine-learning classifiers to determine depths for pixels in a visual content item depicting an object. More particularly, the example environment 100 can include a service provider 102, one or more devices 104, one or more objects 106, and one or more networks 108.

The service provider 102 can be any entity, server(s), platform, console, computer, etc., that facilitates training models for determining disparity and depth for pixels in a visual content item. As described above, a model can be a classifier (e.g., decision forests, neural networks, deep learning neural networks, adaptive boosting, etc.), which can be trained to map pixel shifts to labels that can be leveraged to determine disparity. The service provider 102 can be implemented in a non-distributed computing environment or can be implemented in a distributed computing environment, possibly by running some modules on device(s) 104 or other remotely located devices. As shown, the service provider 102 can include one or more content servers 110, which can include one or more processing units (e.g., processor(s) 112) and computer-readable media 114, such as memory. In some examples, the service provider 102 can obtain training data, utilize machine-learning techniques to train models using the training data to determine disparity for pixels in a visual content item, and output the models to one or more computing devices, such as device(s) 104. In some instances, the service provider 102 can be an entity which designs and/or manufacturers computing devices, such as device(s) 104. For instance, service provider 102 can be entities such as MICROSOFT®, AMAZON®, SONY®, or any other device manufacturer. In instances where device(s) 104 are manufactured by service provider 102, trained models can be installed prior to sale, or alternatively distributed over network(s) 108 to device(s) 104 after sale.

In some examples, the network(s) 108 can be any type of network known in the art, such as the Internet. Moreover, the device(s) 104 can communicatively couple to the network(s) 108 in any manner, such as by a global or local wired or wireless connection (e.g., local area network (LAN), intranet, Bluetooth, etc.). The network(s) 108 can facilitate communication between the service provider 102 and the device(s) 104.

Examples support scenarios where device(s) represented by the one or more content servers 110 can include one or more computing devices that operate in a cluster or another clustered configuration to share resources, balance load, increase performance, provide fail-over support or redundancy, or for other purposes. Device(s) represented by the content server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing device. Device(s) represented by the content server(s) 110 can include any type of computing device having one or more processing units (e.g., processor(s) 112) operably connected to computer-readable media 114 such as via a bus, which in some instances can include one or more of a system bus, a data bus, an address bus, a PCI bus, a Mini-PCI bus, and any variety of local, peripheral, and/or independent buses.

Alternatively, or in addition, the functionality described herein can be performed, at least in part, by one or more hardware logic components such as accelerators. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. Device(s) that can be included in the one or more server(s) 110 can further include one or more input/output (I/O) interface(s) coupled to the bus to allow device(s) to communicate with other devices such as input peripheral devices (e.g., a keyboard, a mouse, a pen, a game controller, a voice input device, a touch input device, a gestural input device, a tracking device, a mapping device, a visual content item camera, a depth sensor, a physiological sensor, and the like) and/or output peripheral devices (e.g., a display, a printer, audio speakers, a haptic output, and the like). Such network interface(s) can include one or more network interface controllers (NICs) or other types of transceiver devices to send and receive communications over a network.

Processing unit(s) (e.g., processor(s) 112) can represent, for example, a CPU-type processing unit, a GPU-type processing unit, a HPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In various examples, the processing unit(s) (e.g., processor(s) 112) can execute one or more modules and/or processes to cause the content server(s) 110 to perform a variety of functions, as set forth above and explained in further detail in the following disclosure. Additionally, each of the processing unit(s) (e.g., processor(s) 112) can possess its own local memory, which also can store program modules, program data, and/or one or more operating systems.

In at least one configuration, the computer-readable media 114 of the content server(s) 110 can include components that facilitate the training one or more models. For example, the computer-readable media 114 can include a training module 116 and a calibration module 118. The components can represent pieces of code executing on a computing device. In at least one example, the training module 116 can be implemented as computer-readable instructions, various data structures, and so forth via at least one processing unit(s) (e.g., processor(s) 112) to configure a device to execute instructions and to perform operations for training one or more models to determine disparity for pixels in a visual content item. Additional details associated with training the one or more models are described in FIG. 3, below. Functionality to perform these operations can be included in multiple devices or a single device.

The computer-readable media 114 can also include a database 120. The database 120 can store data that is organized so that it can be accessed, managed, and updated. In at least one example, the database 120 can store content item(s) 122 that can be utilized for training one or more models 124. As described above, content item(s) 122 can include visual content items including, but not limited to, images, videos, etc.

Additionally, the database 118 can store model(s) 124. In at least one example, the model(s) 124 can include a decision tree. A decision tree is a predictive model that includes a plurality of nodes. In some examples, the decision tree can be a binary decision tree. In such examples, individual nodes of the plurality of nodes can be associated with a decision that has two outcomes. In some examples, the nodes can be arranged in a cascading arrangement of hierarchical layers so that some layers are ranked above other layers. In at least one example, a top layer of nodes can comprise branch nodes to analyze disparities in pixel arrangements in visual content items. For instance, as described above, each branch node can comprise a split function which determines a flow path of a pixel based on pixel attributes. In some examples, a lower layer of nodes can comprise terminal nodes. A terminal node is a node where no decision is made. In decision forests, a terminal node can be called a leaf node. In some examples, a lower layer of nodes can comprise leaf nodes to determine pixel disparities at a subpixel accuracy. As described above, the leaf nodes can correspond to labels such that, once a pixel has been moved through the cascading arrangement of branch nodes, the resulting leaf node to which the pixel was mapped to can identify a label for the pixel.

Depending on the exact configuration and type of the content server(s) 110, the computer-readable media 114 can include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

The training module 116 is configured to use content item(s) 122 to train one or more models 124. The content item(s) 122 can comprise a plurality of visual content items having a reference light pattern projected on objects depicted in individual visual content items. In some examples, the content item(s) 122 can be generated by utilizing accurate stereo matching algorithms to compute depth maps for the content item(s) 122 in the database 120. These depth maps can serve as ground truth disparities for pixel shifts in pixels of a visual content item representing the reference light pattern caused by projecting a reference light pattern onto an object. That is, individual content item(s) 122 stored in the database 120 can each be associated with a ground truth disparity map.

Using the content item(s) 122, the training module 116 can train the model(s) 124. For instance, the training module 116 can use one or more machine-learning algorithms to access the content item(s) 122 and train the model(s) 124. In examples where the model(s) 124 comprise decision forests, the training module can utilize objective functions to identify optimal split function parameters for split functions in each node of the decision forests. In this way, the training module 116 can leverage the ground truth disparities associated with the content item(s) 122 to train the model(s) 124 to map pixels input into the model(s) 124 to an appropriate label based on shifts identified for the pixels.

Calibration module 118 can be utilized to further train the model(s) 124. Calibration module 118 can include intrinsic parameters (e.g., lens parameters, manufacturing parameters, etc.) of a plurality of visual content item capturing devices. A visual content item capturing device (i.e., a still frame camera, video camera, etc.) can capture a visual content item of an object having a reference light pattern projected thereon. In an example, visual content items of content item(s) 122 can be captured using a first visual content item capturing device. Thus, the shifts in pixels of the training visual content items of content item(s) 122 can be specific to intrinsic parameters of the first visual content item capturing device. Thus, the model(s) 124 trained using content item(s) 122 can accurately map pixel shifts of pixels to labels in visual content items captured using the first visual content item capturing device. In some examples, the calibration module 118 can determine intrinsic parameters for the first visual content item capturing device. Additionally, calibration module 118 can also determine intrinsic parameters for a plurality of other visual content item capturing devices. The calibration module 118 can calculate differences between intrinsic parameters of the first visual content item capturing device and the plurality of the other visual content item capturing devices. Based on these differences, the calibration module 118 can create a plurality of calibration parameters for each visual content item capturing device of the plurality of other visual content item capturing devices. Using these calibration parameters, additional model(s) 124 can be produced by applying the calibration parameters to the content item(s) 122 trained using visual content items captured by the first visual content item capturing device. Accordingly, by identifying these calibration parameters, model(s) 124 can accurately map pixel shifts to labels for visual content items captured by the plurality of other visual content item capturing devices. Once trained, the model(s) 124 can be distributed over network(s) 108 to device(s) 104, or can otherwise be made available to the device(s) 104, as described above.

The device(s) 104 can comprise any type of computing device that can be used to determine disparity, and accordingly depth, for pixels in visual content items. In some examples, the device(s) 104 can include a visual content item capturing device 126A and a projector 126B. In some examples, the projector 126B can project a reference light pattern onto an object. The reference light pattern can comprise any type of light, such as visible light, ultraviolet light, near-infrared light, infrared light, or any other type of light. Additionally, the reference light pattern can comprise any type of known pattern, such as pseudo-random dot pattern, a grid pattern, or any other pattern. A visual content item capturing device 126A (i.e., a still frame camera, video camera, etc.) can capture a visual content item of the object having the reference light pattern projected thereon. For instance, the visual content item capturing device can be capable of capturing the reference light pattern at different light wave lengths, such as, but not limited to, visible light or infrared light.

In some examples the visual content item capturing device 126A and projector 126B can be internal to device(s) 104, while in other examples, the visual content item capturing device 126A and projector 126B can be external to, and communicatively coupled to, the device(s) 104. As shown, the visual content item capturing device 126A and the projector 126B can be positioned at a fixed, known baseline 128 relative to each other. The projector 126B can project a reference light pattern the object(s) 106 for a focal length associated with the visual content item capturing device 126A.

As shown, the device(s) 104 can include one or more processing units (e.g., processor(s) 130) operably connected to computer-readable media 132. The one or more processing units (e.g., processor(s) 130) can represent same units and/or perform same functions as processor(s) 112, described above. Computer-readable media 132 can represent computer-readable media 114 as described above. Computer-readable media 132 can include components that determine disparity for pixels of a visual content item depicting an object, such as object(s) 106, having a reference light pattern projected thereon. The components can represent pieces of code executing on a computing device, as described above. Computer-readable media 132 can include at least a patch determination module 134, a classification module 136, a calibration module 138, a depth determination module 140, and one or more applications 142.

In some examples, the patch determination module 134 can move through scanlines of a visual content item to identify one or more pixel patches, such as pixel patch 146, based on known structures of patches of pixels projected in reference light pattern represented in the visual content item. The pixel patches (e.g., pixel patch 146) can be identified by the patch determination module 134 using any pixel feature identification technique, such as identifying patches of pixels based on pixel density, pixel proximity, pixel brightness, or any other pixel feature. In some examples, the patch determination module 134 can move through multiple scanlines of a visual content item in parallel. To identify the pixel patches (e.g., pixel patch 146), the patch determination module 146 can sparsely sample a two-dimensional patch around a pixel and identify the patch based on known structures of patches in a visual content item depicting the reference light pattern.

Further, the patch determination module 134 can identify a particular pixel 148 contained in pixel patch 146 based at least in part on the position of the particular pixel 148 in the pixel patch 146. In one example, the patch determination module 134 can identify the particular pixel 148 based on its location being substantially in a center of a pixel patch 146. However, in other examples, the particular pixel 148 can be identified based on other locations in the pixel patch 146. The patch determination module 134 can additionally identify one or more other pixels 150 in pixel patch 146. Based on known pixel locations representing the reference light pattern in individual pixel patches, the patch determination module 134 can determine the location of the particular pixel 148 relative to other known pixel(s) 150 in the patch. That is, the patch determination module 134 can further identify the location of the particular pixel 148 relative to other pixel(s) 150 in the pixel patch 146.

The patch determination module 134 can identify one or more vectors 152 spanning distances between a position of the particular pixel 148 and respective positions of the other pixel(s) 150. In some instances, pairs of the vector(s) 152 can be identified, and angles defined by the pairs of the vector(s) 152 can be determined. In at least one example, the one or more vectors 152 and/or angles defined by pairs of the vector(s) 152 can be considered attributes associated with a location of a pixel (e.g., pixel 148). In various examples, the pairs of the vector(s) 152 and the angles defined by the pairs can be input into the model(s) 144, described below. Based on the input pairs of the vector(s) 152 and the angles, the model(s) 144 can determine a disparity for the particular pixel 148. Techniques utilized by the model(s) 144 are further discussed below with reference to FIG. 2.

In at least one example, the classification module 136 can include one or more models 144. The model(s) 144 can be the same as model(s) 124, which were trained by training module 116. The classification module 136 can leverage the model(s) 144 to determine disparity associated with individual pixels, and hence depth, for visual content items. Further description of how the classification module 136 utilizes the model(s) 144 to determine disparity for visual content items is described below with reference to FIG. 2.

In various examples, calibration module 138 can be utilized by device(s) 104 to calibrate visual content items obtained by a visual content item capturing device to adjust for differences in positions of the visual content item capturing device 126A and the projector 126B. For instance, as shown in FIG. 1, the device(s) 104 can have the visual content item capturing device 126A and the projector 126B mounted to it. However, the visual content item capturing device 126A and projector 126B are placed at different positions horizontally, and in some instances, vertically. The calibration module 138 can calibrate the system of the visual content item capturing device 126A and projector 126B such that any disparity in their positions is adjusted to obtain accurate representations of pixels projected in the reference light pattern onto the object(s) 106.

In some instances, the depth determination module 140 can determine depth for pixels in a visual content item based on pixel disparities identified the classification module 136. For instance, in at least one example, the depth determination module 140 can receive disparities determined by the classification module 136 and can calculate depth Z for a particular pixel using the formula $$Z = \frac{bf}{d},$$

where b is the baseline 128, $f$ is the focal length of the visual content item capturing device 126A, and d is the disparity for the pixel.

In some examples, the application(s) 142 can call the classification module 136 to determine disparity for pixel shifts in visual content items obtained by the visual content item capturing device 126A associated with the device(s) 104. For example, application(s) 142 can provide utility, entertainment, educational, and/or productivity functionalities to users of the device(s) 104. The application(s) 142 can be built into a device (e.g., telecommunication, text message, clock, camera, etc.) or can be customized (e.g., games, news, transportation schedules, online shopping, etc.). The application(s) 142 can comprise any type of application that can use three-dimensional visual content items, such as a gaming application, a design application, a transportation application, a virtual reality application, or any other type of application.

In some examples, device(s) 104 can represent a diverse variety of device types and are not limited to any particular type of device. Examples of device(s) 104 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital signal processors, or any other sort of processing device, or the like. In at least one example, the device(s) 104 can include VR/MR devices (e.g., CANON® MREAL® System, MICROSOFT® HOLOLENS®, etc.).

Device(s) 104 can include one or more input/output (I/O) interface(s) coupled to the bus to allow device(s) to communicate with other devices such as input peripheral devices (e.g., a keyboard, a mouse, a pen, a game controller, a voice input device, a touch input device, a gestural input device, a tracking device, a mapping device, a visual content item camera, a depth sensor, a physiological sensor, and the like) and/or output peripheral devices (e.g., a display, a printer, audio speakers, a haptic output, and the like). As described above, in some examples, the I/O devices can be integrated into the content server(s) 110 and/or other machines and/or devices 104. In other examples, the one or more input peripheral devices can be communicatively coupled to the content server(s) 110 and/or other machines and/or device(s) 104. One or more of the input peripheral devices can be associated with a single device (e.g., MICROSOFT® KINECT®, INTEL® Perceptual Computing SDK 2013, LEAP MOTION®, etc.) or separate devices.

Figure 2:
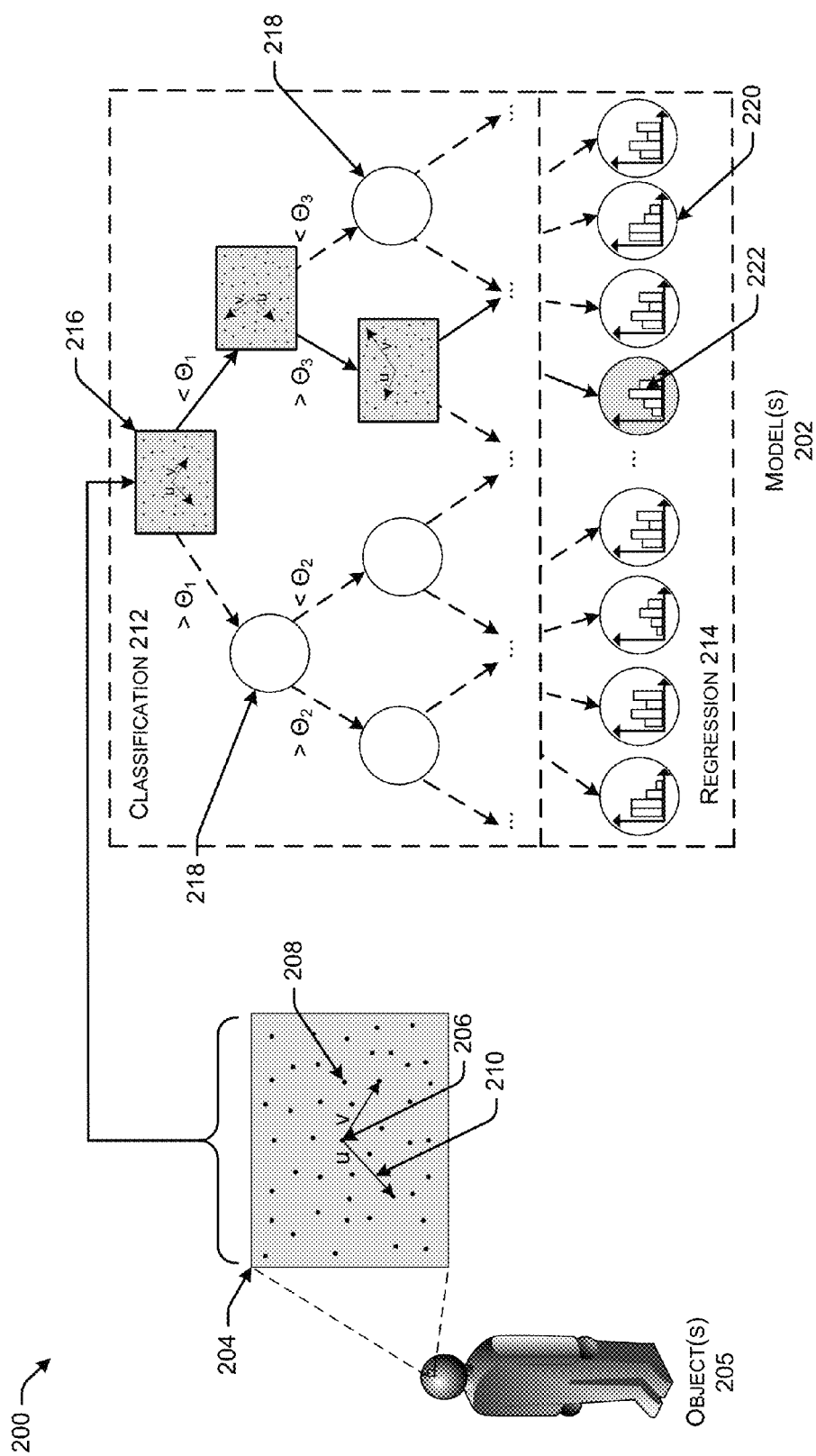
FIG. 2 is a schematic diagram showing an example decision forest having a plurality of nodes arranged in a cascading structure.

FIG. 2 is a schematic diagram 200 showing one or more example models 202, such as model(s) 144. As described above, in at least one example, the model(s) 144 can include a decision forest of decision trees having a plurality of nodes arranged in a cascading structure. While FIG. 2 depicts model(s) 202 as one or more decision forests, in other examples, model(s) 202 can comprise any type of classification model. As illustrated in FIG. 2, the classification module 136 can input a pixel patch 204 of a visual content item representing a reference light pattern projected onto one or more objects 205 into the model(s) 202. The pixel patch 204 can be a same pixel patch as pixel patch 146 in FIG. 1. The pixel patch 204 can comprise a particular pixel 206 (e.g., particular pixel 148), one or more other pixels 208 (e.g., other pixel(s) 150), and one or more pairs of vectors 210 (e.g., pairs of vector(s) 152). As shown, the particular pixel 206, other pixel(s) 208, and pairs of vector(s) 210 can be input into the model(s) 202. In at least one example, individual pixels (e.g., pixel 206) can be processed utilizing individual model(s) 202 in parallel.

As shown in FIG. 2, the model(s) 202 can comprise a classification portion 212 and a regression portion 214. The classification portion 212 can include a root node 216 and a plurality of branch nodes 218. In some examples, the root node 216 and the branch nodes 218 can each include split functions for determining a flow of the particular pixel 206 through the model(s) 202. When the pixel patch 204 is input into the root node 216, the root node 216 and each node of the branch nodes 218 include split functions to determine which node to pass the particular pixel 206 onto based at least in part on an angle defined by the pairs of vector(s) 210. For example, each node contains learned parameters δ=(u, v, θ), where (u, v) represent pairs of vector(s) 210 and θ represents a threshold angle. In at least one example, given that for the particular pixel 206, p=(x, y), and that the visual content item depicting with the reference light pattern is I, the model(s) 202 can infer a probability distribution p(c|p, I) over the C labels. The split function $f$ for each node can be evaluated for the particular pixel 206 using EQUATION 1, shown below.

$$f(p, \theta) = \begin{cases} L & \text{if } I(p+u) - I(p+v) < \theta \\ R & \text{otherwise} \end{cases} \quad \text{EQUATION 1}$$

Thus, in some examples, each node of the branch nodes 218 can determine the flow for the particular pixel 206 based on angles defined by different pairs of vector(s) 210 corresponding to the other pixel(s) 208. Accordingly, the particular pixel 206 can be moved through the cascading arrangement of the branch nodes 218 to reach the regression portion 214 of the model(s) 202.

In various examples, the regression portion 214 of the model(s) 202 can comprise a plurality of leaf nodes 220. The leaf nodes can correspond to labels such that, once the particular pixel 206 has moved through the branch nodes 218, the resulting leaf node 220 to which the particular pixel 206 is mapped to can identify a label for the particular pixel 206. In some examples, the leaf nodes 220 can include probability distributions 222 indicating a probability that the particular pixel 206 belongs to the leaf node 220 to which the particular pixel 206 is mapped. For instance, assuming that the particular pixel 206 is represented by p=(x, y), and that the model(s) 202 comprise a plurality of trees, the output of a single tree $f$ can be represented as shown in EQUATION 2, below.

$$\hat{c}_f = \text{argmax } p_{(y,f)}(c|p,I) \quad \text{EQUATION 2}$$

In EQUATION 2, $p_{(y,f)}$ denotes the probability that the particular pixel 206 is correctly mapped to the label c for a scanline y. The classification module 136 can assign a disparity d=ĉ−x to a particular pixel 206 based on determining the label associated with the highest probability, or a probability above a threshold. In some examples, outputs from more than one model (e.g., model(s) 202) can be aggregated to determine a label to assign to a particular pixel 206.

In at least one example, inaccurately predicted labels determined for pixels can be invalidated based on the posterior p(y,$f$)(c|p, I) as indicating the confidence for the prediction. For instance, predicated labels determined for pixels can be invalidated based on one or more criteria. The criteria can include a signal criterion, a probability criterion, a top prediction criterion, and a disparity criterion. Additional and/or alternative criterion can be considered. A signal criterion can invalidate a pixel label based on the pixel not observing a sufficient amount of signal τ=500 in the reference projection pattern. A probability criterion can invalidate a pixel label based on the probability distribution 222 being lower than a threshold probability distribution. A top predication criterion can invalidate a pixel label based on a disparity between two top prediction distributions 222 being less than a threshold disparity range. A disparity check criterion can invalidate a pixel label based on the label belonging to a non-valid label range.

In various examples, the labels of the leaf nodes 220 can further be subdivided into sublabels corresponding to subpixels. For instance, the regression portion 214 can include a regression algorithm utilized to determine labels that maintain subpixel accuracy. The labels can further identify shifts of the particular pixel to subpixel accuracy. This can allow for a more accurate determination of a disparity associated with subpixel shifts of the particular pixel 206.

The depth determination module 140 can determine depth for the particular pixel 204 based on the label to which the particular pixel 206 was mapped. For example, disparity, which is the shift of an x-coordinate of the particular pixel 206, is inversely proportional to depth. For example, depth Z for the particular pixel 206 can be derived using the EQUATION 3, shown below.

$$Z = \frac{bf}{d} \quad \text{EQUATION 3}$$

In EQUATION 3, b is the baseline between the visual content item capturing device and the projector, f is the focal length associated with the visual content item capturing device, and d is the disparity determined for the particular pixel 206. As described above, the disparity d can correspond to a label that is determined based at least in part on the classification module 136 causing the pixel patch 204 to move through the model(s) 202.

Figure 3:
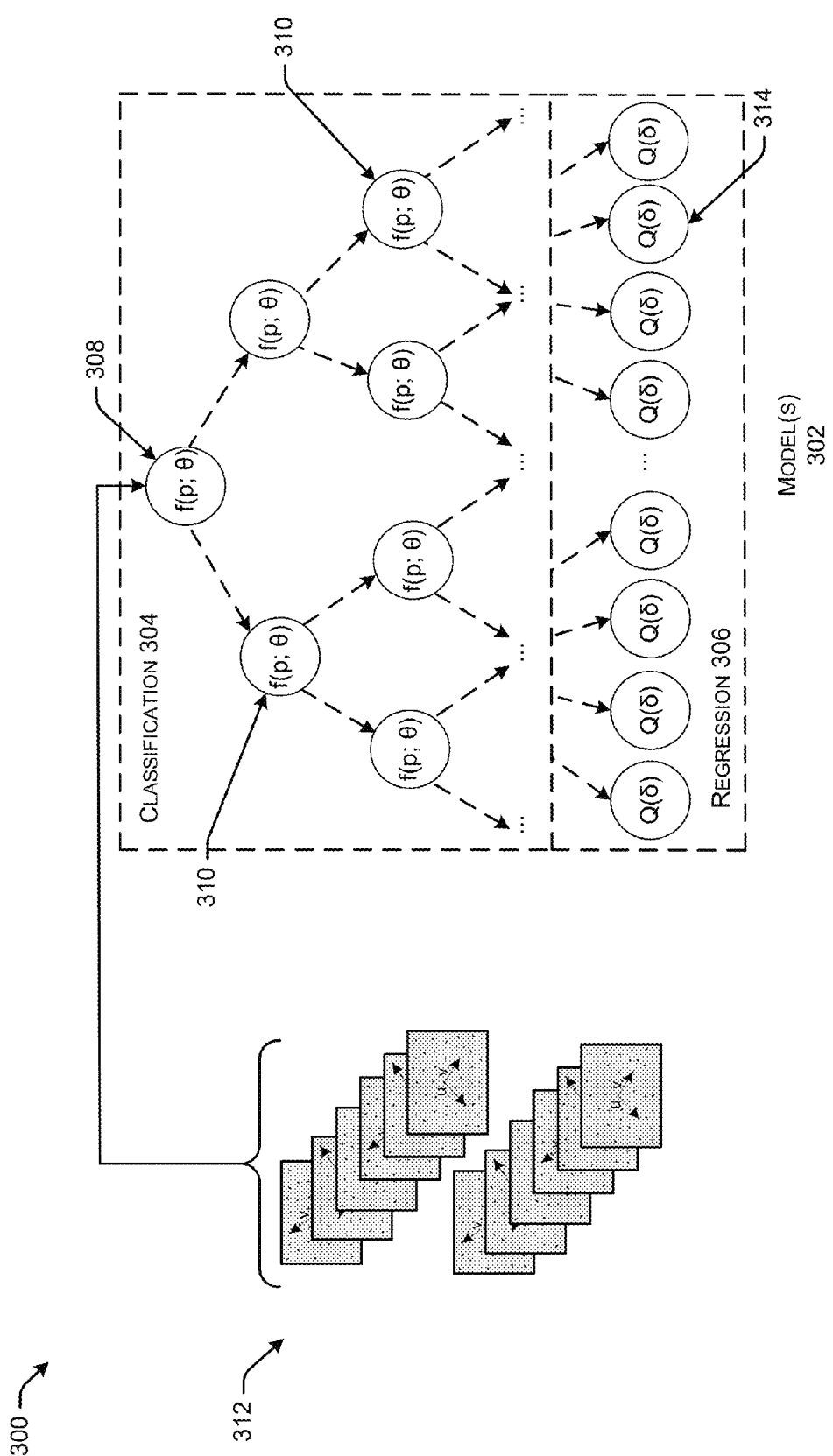
FIG. 3 is a schematic diagram showing training an example decision forest to determine disparity for a pixel using training data.

FIG. 3 is a schematic diagram 300 showing model(s) 302 being trained to determine a label corresponding to disparity for a pixel using training data. The techniques described with reference to FIG. 3 can be performed by training module 116. As shown, the model(s) 302 can include a classification portion 304 and a regression portion 306. The classification portion 304 can comprise a root node 308 and a plurality of branch nodes 310. In some examples, training module 116 can obtain training data 312. The training data 312 can correspond to content item(s) 122 stored in the database 120. In at least one example, the training data 312 can comprise visual content items having pixels with ground truth disparities determined using an accurate stereo matching algorithm. The training data 312 can be input into the root node 308 of the model(s) 302 to begin training of the model(s) 302. The model(s) 302 can correspond to model(s) 124 that are stored in database 120 after the model(s) 302 have been trained. As described above, model(s) 124 can correspond to model(s) 144 and model(s) 202.

The training data 312 can include training examples (p, c), where p identifies a pixel within a particular visual content item of the training data 312 and c is the pixel's ground truth label. Starting at the root node 308, the training module 116 can propose a candidate split function parameters δ. In some examples, the candidate split function parameters δ can be proposed at random. For each candidate split function parameter, the training data 312 is partitioned into left $S_L(\delta)$ and right $S_R(\delta)$ child sets, according to a split function f (p, θ) for each of the branch nodes 310. For each of these partitions, an objective function can be evaluated, and the candidate δ that maximized the objective is chosen. For example, an objective function can comprise EQUATION 4, shown below. In EQUATION 4, S represents a subgroup of a group of training data 312.

$$Q(\delta) = E(S) - \sum_{d \in \{L,R\}} \frac{|S_d(\delta)|}{|S|} E(S_d(\delta)) \quad \text{EQUATION 4}$$

The entropy E(S) can be the Shannon entropy of the empirical distribution p(c|S) of the labels c in S where the entropy E(S) can be calculated using the EQUATION 5 and the empirical distribution p(c|S) is defined according to EQUATION 6, each shown below.

$$E(S) = -\sum_{c=1}^{C} p(c \mid S) \log p(c \mid S) \quad \text{EQUATION 5}$$

$$p(c \mid S) = \frac{1}{|S|} \sum_{(\cdot, \acute{c}) \in S} [c = \acute{c}] \quad \text{EQUATION 6}$$

Using these functions, the training can continue greedily (i.e., layer-by-layer) down the model(s) 302, recursively partitioning the original training pixel patches 312 into successively smaller groups. Training can stop when a node reaches a maximum depth, contains too few examples, and/or has too low entropy or differential entropy. In this way, the branch nodes 310 of the model(s) 302 can be trained to map pixels to labels.

The regression portion 306 of the model(s) 302 can be trained using a regression function, or algorithm. The training module 116 can train leaf nodes 314 of the regression portion 306 of the model(s) 302. For instance, the training module 116 can utilize a regression function to train the leaf nodes 314 to obtain subpixel accuracy in labels associated with the leaf nodes. For example, the regression algorithm can minimize EQUATION 5 shown above where the entropy E(S) is generalized to handle continuous values.

Example Processes

The processes described in FIGS. 4-6 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
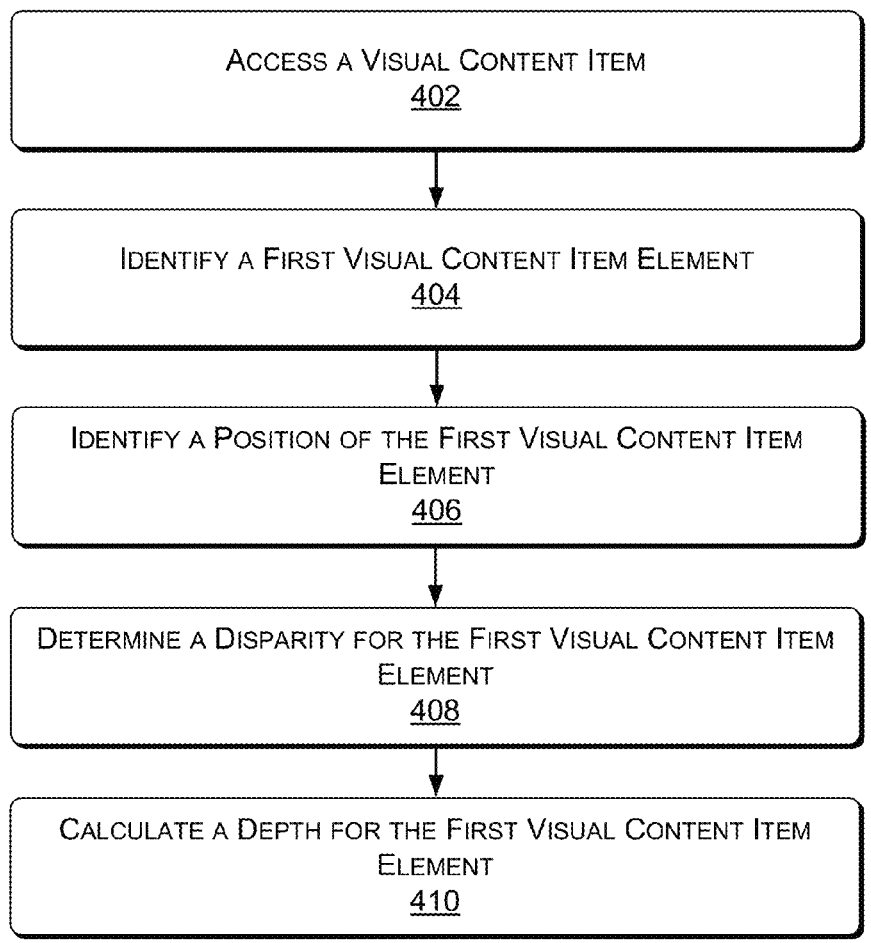
FIG. 4 is a flow diagram showing an example process to determine a disparity for a visual content item element of a visual content item based at least in part on a position of the visual content item element relative to other visual content item elements representing a reference light pattern in the visual content item.

FIG. 4 is a flow diagram showing an example process 400 for determining a disparity for a visual content item element of a visual content item (e.g., an image, video, etc.) based at least in part on a position of the visual content item element relative to other visual content item elements. For the purpose of this discussion, a visual content item element may be a pixel, a feature, a group of features, etc.

Block 402 illustrates accessing a visual content item. As described above, the device(s) 104 can include or be associated with the visual content item capturing device 126A and the projector 126B. The device(s) 104 can receive a visual content item from the visual content item capturing device 126A associated with the device(s) 104. The visual content item can include a reference light pattern projected by the projector 126B onto an object.

Blocks 404-410 illustrate logical operations for determining disparity for a first visual content item element of a plurality of visual content item elements of a visual content item representing the reference light pattern, the disparity caused by projecting the reference light pattern onto an object.

Block 404 illustrates identifying a first visual content item element of a plurality of visual content item elements projected onto an object. In some examples, the patch determination module 134 can identify the first visual content item by scanning a scanline of the visual content item and identifying a two-dimensional patch of the visual content item located on the scanline. The two-dimensional patch can include a group of visual content item elements. Further, the patch determination module 134 can identify a first visual content item element from the group of visual content item elements based at least in part on the first visual content item element being located substantially in a center of the two-dimensional patch.

Block 406 illustrates identifying a position of the first visual content item element relative to a group of visual content item elements. In some examples, the patch determination module 134 can determine a plurality of vectors spanning from the position of the first visual content item element to respective positions of the group of visual content item elements. Further, the patch determination module 134 can determine a plurality of angles defined by pairs of the plurality of vectors.

Block 408 illustrates determining disparity for the first visual content item element. The classification module 136 can determine disparity for the first visual content item element based at least in part on the position of the first visual content item element relative to the group of visual content item elements. In some examples, the classification module 136 can input the first visual content item element into model(s) 144, where the model(s) 144 may comprise one or more decision forests comprising an arrangement of a plurality of nodes for the first visual content item element to move through, each node of the plurality of nodes comprising a split function (e.g., EQUATION 1) for determining a flow of the first visual content item element through the arrangement of the plurality of nodes to reach at least one of a plurality of leaf nodes, each of the plurality of leaf nodes corresponding to a label. Further, the classification module 136 can determine a leaf node of the plurality of leaf nodes to which the visual content item element belongs by causing the first visual content item element to move through the arrangement of the plurality of nodes. Based at least in part on the leaf node, the classification module 136 can identify a label to which the visual content item element belongs and identify the disparity for the first visual content item element based at least in part on the label.

Block 410 illustrates calculating depth for the first visual content item element. The depth determination module 140 can determine depth for the first visual content item element based at least in part on the disparity determined for the first visual content item element. For example, depth is inversely proportional to disparity such that depth $$Z = \frac{bf}{d},$$

where b is a baseline between a visual content item capturing device and a projector used to obtain the visual content item, ƒ is the focal length associated with the visual content item capturing device, and d is the disparity determined for the first visual content item element.

Figure 5:
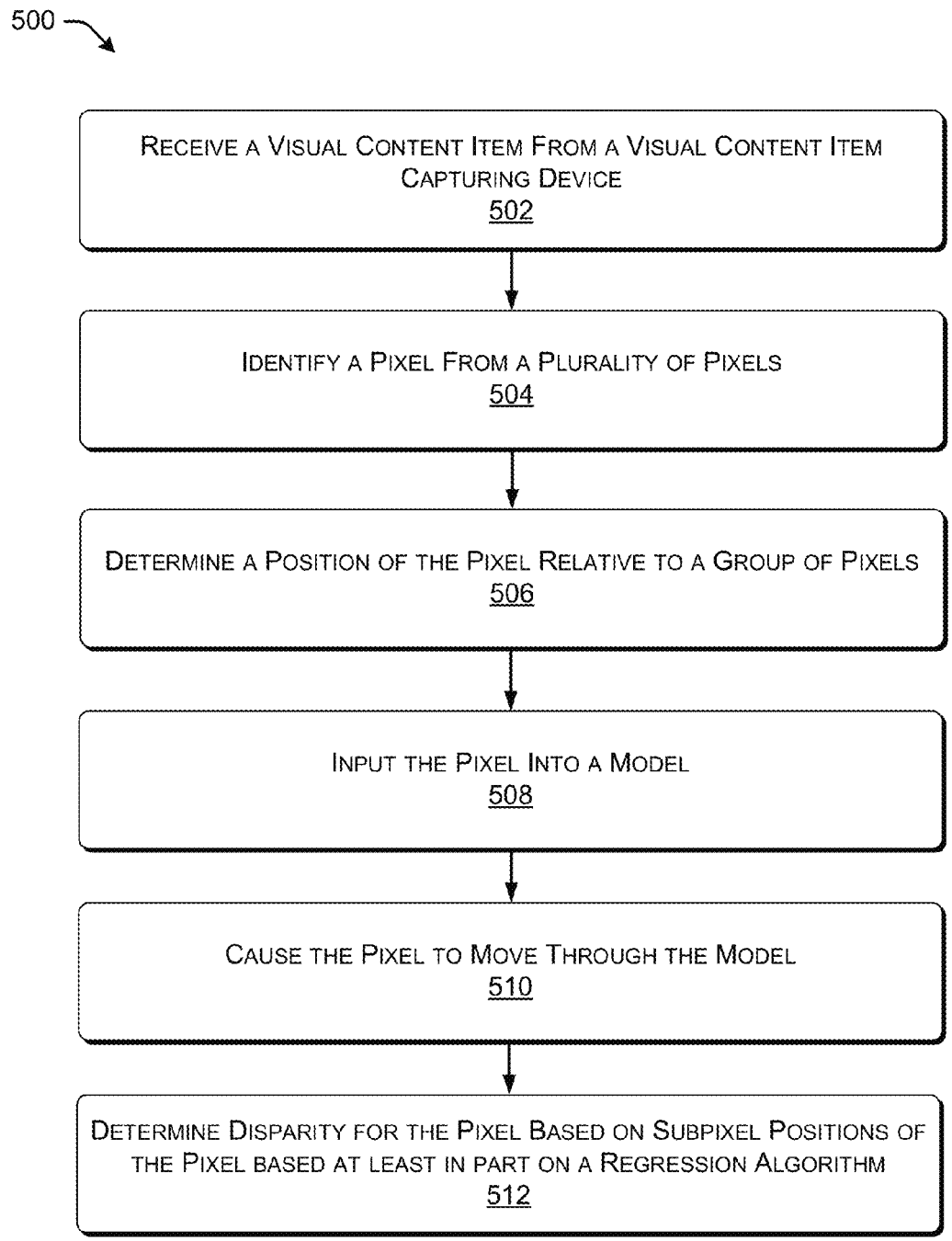
FIG. 5 is a flow diagram showing an example process for determining a disparity for a pixel based at least in part on the position of the pixel relative to other pixels in a visual content item associated with a reference light pattern.

FIG. 5 is a flow diagram showing an example process 500 for determining a disparity for a pixel based at least in part on the position of the pixel relative to other pixels in a visual content item associated with a reference light pattern.

Block 502 illustrates receiving a visual content item from a visual content item capturing device. In some examples, the device(s) 104 can receive, via communication connections, the visual content item from the visual content item capturing device 126A associated with the device(s) 104.

Block 504 illustrates identifying a pixel from a plurality of pixels. In some instances, to identify the pixel, the patch determination module 134 can move through a scanline of the visual content item to identify a patch of the visual content item located along the scanline. In at least one example, the patch may include a group of pixels, and the patch determination module 134 can identify the pixel from the group of pixels based at least in part on the pixel being located substantially in a center of the patch. In some instances, to identify the patch of the visual content item located along the scanline, the patch determination module 134 can identify a structure of the group of pixels corresponding to a known pixel structure of the visual content item associated with the reference light pattern based at least in part on features of the pixels.

Block 506 illustrates determining a position of the pixel relative to a group of pixels. In some examples, patch determination module 134 can determine a plurality of vectors spanning from a position of the pixel to respective positions of the group of pixels. Further, the patch determination module 134 can determine a plurality of angles defined by pairs of the plurality of vectors.

Block 508 illustrates inputting the pixel into a model. In some examples, patch determination module 134 can input the first input pixel into classification module 136. Classification module 136 can include model(s) 144 trained by training module 116 using machine-learning techniques to determine disparities for the pixel based on changes in a position of the pixel caused by the object. As described above, in at least one example, the model(s) 144 may include a decision tree forest of decision trees.

Block 510 illustrates causing the pixel to move through the model to determine a disparity for the pixel. For instance, the processor(s) 130 can execute the classification module 136. In some examples, the classification module 136 can comprise model(s) 144 trained to determine the disparity for the pixel based at least in part on the position of the pixel relative to respective positions of the first group of pixels. In some examples, the classification module 136 can utilize the model(s) 144 comprising one or more decision forests including cascading arrangements of nodes for pixels to move through, the nodes each comprising a split function (e.g., EQUATION 1) for determining a next node for the plurality of pixels to flow to in the cascading arrangements of nodes to reach leaf nodes, the leaf nodes corresponding to labels associated with disparities for the plurality of pixels. Additional details are discussed in FIG. 2, above.

Block 512 illustrates determining disparity for the pixel based on subpixel positions of the pixel based at least in part on a regression algorithm. For example, classification module 136 can cause the processor(s) 130 to execute a regression algorithm that determines disparity for the pixel based on subpixel positions of the pixel. In this way, the classification module 136 can determine disparity for the pixel with subpixel accuracy. Additional details are discussed in FIG. 2, above.

Figure 6:
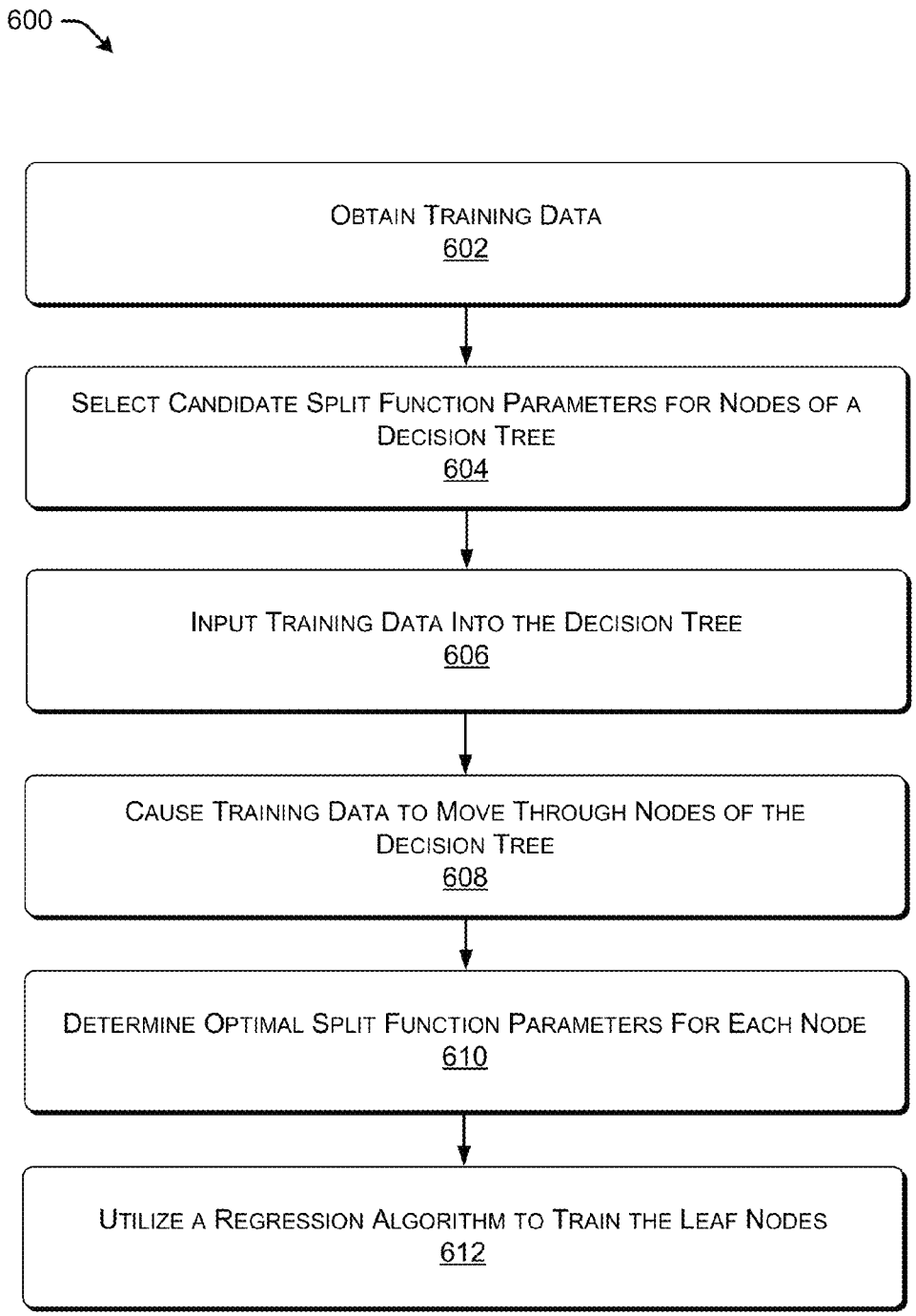
FIG. 6 is a flow diagram showing an example process for training decision trees to determine disparities for pixels of a visual content item caused by projecting a reference light pattern onto an object.

FIG. 6 is a flow diagram showing an example process for training decision trees to determine disparities for pixels of a visual content item caused by projecting a reference light pattern onto an object.

Block 602 illustrates obtaining training data. In some examples, obtaining the training data can comprise receiving, at the content server(s) 110 and from a plurality of devices (e.g., device(s) 104), a plurality of visual content items (e.g., content item(s) 122). The training module 116 can utilize accurate stereo matching algorithms to determine ground truth depth maps for the plurality of training visual content items.

Block 604 illustrates selecting candidate split function parameters for each node of the plurality of nodes. In some examples, the training module 116 can propose the candidate split function parameters at random.

Block 606 illustrates inputting the training data into a decision tree. The training module 116 can input the training data (e.g., content item(s) 122) into a root node of the decision tree (e.g., model(s) 124).

Block 608 illustrates causing the training data to move through nodes of the decision tree. For example, training module 116 can cause processor(s) 112 to execute machine-learning algorithms to cause the training data to move through the plurality of nodes such that the candidate split functions of the nodes evaluate the training data based at least in part on the candidate split function parameters, the candidate split functions causing the training data to recursively partition into successively smaller groups of training data. Additional details are discussed in FIG. 3, above.

Block 610 illustrates determining optimal split function parameters for each node. For instance, machine-learning algorithms can utilize an objective function to determine optimal split function parameters by choosing a candidate split function parameter that maximizes the objective. Additional details are discussed in FIG. 3, above.

Block 612 illustrates utilizing a regression algorithm to train the leaf nodes. For instance, the training module 116 can utilize a regression algorithm or function to train the leaf nodes to obtain subpixel accuracy in labels associated with the leaf nodes. Additional details are discussed in FIG. 3, above.

Example Clauses

A. A system comprising: one or more processors; memory; and one or more modules stored in the memory and executable by the one or more processors to perform operations comprising: accessing a visual content item comprising a plurality of visual content item elements representing a reference light pattern associated with an object; determining disparity for a visual content item element of the plurality of visual content item elements, the determining comprising: identifying the visual content item element; identifying a position of the visual content item element relative to a group of visual content item elements of the plurality of visual content item elements; and determining, by executing one or more classifiers, the disparity for the visual content item element based at least in part on the position; and determining depth for a portion of the visual content item based at least in part on the disparity determined for the visual content item element.

B. A system as paragraph A recites, wherein identifying the visual content item element comprises: scanning a scanline of the visual content item; identifying a two-dimensional patch of the visual content item located on the scanline, the two-dimensional patch comprising the visual content item element and the group of visual content item elements; and identifying the visual content item element based at least in part on the visual content item element being located substantially in a center of the two-dimensional patch.

C. A system as paragraph A or B recite, wherein: the one or more classifiers includes at least a decision forest comprising an arrangement of a plurality of nodes for the visual content item element to move through, each node of the plurality of nodes comprising a split function for determining a flow of the visual content item element through the arrangement of the plurality of nodes to reach at least one of a plurality of leaf nodes, each of the plurality of leaf nodes corresponding to a label; and determining the disparity for the visual content item element comprises: inputting the visual content item element into the decision forest; determining a leaf node of the plurality of leaf nodes to which the visual content item element belongs by causing the visual content item element to move through the arrangement of the plurality of nodes; identifying a label to which the visual content item element belongs based at least in part on the leaf node; and identifying the disparity for the visual content item element based at least in part on the label.

D. A system as paragraph C recites, wherein identifying the position of the visual content item element relative to the group of visual content item elements comprises: determining a plurality of vectors spanning from the position of the visual content item element to respective positions of the group of visual content item elements; and determining a plurality of angles defined by pairs of the plurality of vectors.

E. A system as paragraph D recites, wherein split functions for each node of the plurality of nodes determine the flow of the visual content item element through the arrangement of the plurality of nodes based at least in part on an angle of the plurality of angles.

F. A system as any of paragraphs A-E recite, further comprising: a projecting device to project the reference light pattern onto the object; and a visual content item capturing device to capture the visual content item comprising the plurality of visual content item elements representing the reference light pattern projected onto the object.

G. A computer-implemented method, the method comprising: receiving a visual content item from a visual content item capturing device, the visual content item comprising a plurality of pixels representing a reference light pattern projected onto an object; determining a position of the first pixel relative to a first group of pixels of the plurality of pixels; inputting the first pixel into a first classifier, the first classifier being trained using machine-learning techniques to determine disparities for individual pixels of the plurality of pixels based on changes in a position of the plurality of pixels; and determining, based at least in part on executing the first classifier, a disparity for the first pixel based at least in part on the position of the first pixel relative to the first group of pixels.

H. A computer-implemented method as paragraph G recites, wherein identifying the first pixel from the plurality of pixels comprises: scanning a scanline of the visual content item; identifying a patch of the visual content item located along the scanline, the patch comprising the first pixel and the first group of pixels; and identifying the first pixel based at least in part on the first pixel being located substantially in a center of the patch.

I. A computer-implemented method as paragraph H recites, wherein identifying the patch of the visual content item located along the scanline comprises identifying a structure of the first group of pixels corresponding to a known pixel structure associated with the visual content item depicting the reference light pattern based at least in part on features of the pixels.

J. A computer-implemented method as any of paragraphs G-I recite, further comprising: inputting a second pixel into a second classifier; and determining, based at least in part on executing the second classifier, a disparity for the second pixel based at least in part on the position of the second pixel relative to a second group of pixels, wherein the first classifier is executed in parallel with the second classifier.

K. A computer-implemented method as paragraph J recites, wherein the first classifier is associated with a first scanline and the second classifier is associated with a second scanline.

L. A computer-implemented method as any of paragraphs G-K recite, wherein the first classifier comprises a decision forest comprising a cascading arrangement of nodes for the plurality of pixels to move through, the nodes each comprising a split function for determining a next node for the plurality of pixels to flow to in the cascading arrangement of nodes to reach leaf nodes, the leaf nodes corresponding to labels associated with disparities for the plurality of pixels.

M. A computer-implemented method as paragraph L recites, wherein: the labels are further divided into sublabels corresponding to subpixel disparities; and the computer-implemented method further comprises determining, based at least in part on executing a regression algorithm, the disparity for the first pixel based at least in part on the position of subpixels of the first pixel.

N. A computer-implemented method as any of paragraphs G-M recite, further comprising: determining whether the disparity determined for the first pixel satisfies criteria; and based at least in part on determining that the disparity determined for the first pixel does not satisfy the criteria, invalidating the disparity determined for the first pixel.

O. A computer-implemented method as any of paragraphs G-N recite, further comprising: determining whether the disparity determined for the first pixel satisfies criteria; and based at least in part on determining that the disparity determined for the first pixel satisfies the criteria, calculating depth for a portion of the visual content item associated with the first pixel based at least in part on the disparity for the first pixel.

P. One or more computer-readable media encoded with instructions that, when executed by a processor, configure a computer to perform a computer-implemented method as any of paragraphs G-O recite.

Q. A device comprising one or more processor and one or more computer-readable media encoded with instructions that, when executed by the one or more processors, configure a computer to performed a computer-implemented method as any of paragraphs G-O recite.

R. A computer-implemented method, the method comprising: means for receiving a visual content item from a visual content item capturing device, the visual content item comprising a plurality of pixels representing a reference light pattern projected onto an object; means for identifying a first pixel from the plurality of pixels; means for determining a position of the first pixel relative to a first group of pixels of the plurality of pixels; means for inputting the first pixel into a first classifier, the first classifier being trained using machine-learning techniques to determine disparities for individual pixels of the plurality of pixels based on changes in a position of the plurality of pixels; and means for determining, based at least in part on executing the first classifier, a disparity for the first pixel based at least in part on the position of the first pixel relative to the first group of pixels.

S. A computer-implemented method as paragraph R recites, wherein identifying the first pixel from the plurality of pixels comprises: means for scanning a scanline of the reference light pattern; means for identifying a patch of the visual content item located along the scanline, the patch comprising the first group of pixels; and means for identifying the first pixel from the first group of pixels based at least in part on the first pixel being located substantially in a center of the patch.

T. A computer-implemented method as paragraph S recites, wherein identifying the patch of the visual content item located along the scanline comprises means for identifying a structure of the first group of pixels corresponding to a known pixel structure associated with the visual content item depicting the reference light pattern based at least in part on features of the pixels.

U. A computer-implemented method as any of paragraphs R-T recite, further comprising: means for inputting a second pixel into a second classifier; and means for determining, based at least in part on executing the second classifier, a disparity for the second pixel based at least in part on the position of the second pixel relative to a second group of pixels, wherein the first classifier is executed in parallel with the second classifier.

V. A computer-implemented method as paragraph U recites, wherein the first classifier is associated with a first scanline and the second classifier is associated with a second scanline.

W. A computer-implemented method as any of paragraphs R-V recite, wherein the first classifier comprises a decision forest comprising a cascading arrangement of nodes for pixels to move through, the nodes each comprising a split function for determining a next node for the plurality of pixels to flow to in the cascading arrangement of nodes to reach leaf nodes, the leaf nodes corresponding to labels associated with disparities for the plurality of pixels.

X. A computer-implemented method as paragraph W recites, wherein: the labels are further divided into sublabels corresponding to subpixel disparities; and the computer-implemented method further comprises means for determining, based at least in part on executing a regression algorithm, the disparity for the first pixel based at least in part on the position of subpixels of the first pixel.

Y. A computer-implemented method as any of paragraphs R-X recite, further comprising: means for determining whether the disparity determined for the first pixel satisfies criteria; and based at least in part on determining that the disparity determined for the first pixel does not satisfy the criteria, means for invalidating the disparity determined for the first pixel.

Z. A computer-implemented method as any of paragraphs R-Y recite, further comprising: means for determining whether the disparity determined for the first pixel satisfies criteria; and based at least in part on determining that the disparity determined for the first pixel satisfies the criteria, means for calculating depth for a portion of the visual content item associated with the first pixel based at least in part on the disparity for the first pixel.

AA. One or more computer storage media storing computer-executable instructions that, when executed by one or more processors, configure the one or more processors to perform operations comprising: obtaining training data for training decision trees, the training data comprising pixels obtained from a plurality of training visual content items, each pixel of the pixels being associated with a ground truth disparity of a plurality of ground truth disparities; and training, by executing one or more machine-learning algorithms, a first decision tree using the training data, the first decision tree comprising a root, a plurality of nodes arranged in a cascading formation, and a plurality of leaf nodes disposed at an end of the cascading formation of the plurality of nodes opposite the root, each node of the plurality of nodes comprising a split function to determine a next node of the plurality of nodes for the pixels to flow to, the training comprising: selecting candidate split function parameters for each node of the plurality of nodes; inputting the training data at the root of the first decision tree; causing the training data to move through the plurality of nodes such that split functions corresponding to individual nodes of the nodes evaluate the training data based at least in part on the candidate split function parameters, the split functions causing the training data to recursively partition into successively smaller groups of training data; and determining, by executing an objective function, optimal split function parameters for each of the plurality of nodes based at least in part on the training data moving through the plurality of nodes.

AB. One or more computer storage media as paragraph AA recites, the operations further comprising: obtaining the plurality of training visual content items, the plurality of training visual content items being captured by a visual content item capturing device; executing a stereo matching algorithm to compute disparity maps for each of the training visual content items; and determining the ground truth disparities for pixels contained in the training visual content items based at least in part on the disparity maps.

AC. One or more computer storage media as either paragraph AA or AB recite, wherein: the plurality of training visual content items are captured by a first visual content item capturing device; and the operations further comprise: determining intrinsic parameters of the first visual content item capturing device; determining intrinsic parameters of a second visual content item capturing device; calculating differences between the intrinsic parameters of the first visual content item capturing device and the intrinsic parameters of the second visual content item capturing device; and modifying the first decision tree based at least in part on the differences to create a second decision tree associated with the second visual content item capturing device.

AD. One or more computer storage media as any of paragraphs AA-AC recite, wherein the candidate split function parameters comprise threshold angles defined by pairs of vectors, each pair of vectors of the pairs of vectors comprising a first vector spanning from a first pixel to a second pixel and a second vector spanning from the first pixel to a third pixel.

AE. One or more computer storage media as any of paragraphs AA-AD recite, the training further comprising utilizing a regression algorithm to train the plurality of leaf nodes to map the pixels to disparity sublabels based at least in part on shifts of subpixels of the pixels.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

As described above, while the disclosure describes classifiers that use decision forests, many of the techniques described herein can be performed using other classification or regression algorithms, such as neural networks, deep learning neural networks, adaptive boosting, or any other classification or regression algorithm.

What is claimed is:

1. A system comprising:
one or more processors;
memory; and
one or more modules stored in the memory and executable by the one or more processors to perform operations comprising:
accessing a visual content item comprising a plurality of visual content item elements representing a reference light pattern associated with an object;
determining disparity for a visual content item element of the plurality of visual content item elements, the determining comprising:
identifying the visual content item element;
identifying a position of the visual content item element relative to a group of visual content item elements of the plurality of visual content item elements; and
determining, by executing one or more classifiers, the disparity for the visual content item element based at least in part on the position, wherein the one or more classifiers include a plurality of nodes for the visual content item element to move through, each node of the plurality of nodes comprising a split function for determining a flow of the visual content item element through an arrangement of the plurality of nodes to reach at least one of a plurality of leaf nodes; and
determining depth for a portion of the visual content item based at least in part on the disparity determined for the visual content item element.

2. A system as claim 1 recites, wherein identifying the visual content item element comprises:
scanning a scanline of the visual content item;
identifying a two-dimensional patch of the visual content item located on the scanline, the two-dimensional patch comprising the visual content item element and the group of visual content item elements; and
identifying the visual content item element based at least in part on the visual content item element being located substantially in a center of the two-dimensional patch.

3. A system as claim 1 recites, wherein:
the one or more classifiers includes at least a decision forest comprising the arrangement of the plurality of nodes for the visual content item element to move through, each of the plurality of leaf nodes corresponding to a label; and
determining the disparity for the visual content item element comprises:
inputting the visual content item element into the decision forest;
determining a leaf node of the plurality of leaf nodes to which the visual content item element belongs by causing the visual content item element to move through the arrangement of the plurality of nodes;
identifying a label to which the visual content item element belongs based at least in part on the leaf node; and
identifying the disparity for the visual content item element based at least in part on the label.

4. A system as claim 3 recites, wherein identifying the position of the visual content item element relative to the group of visual content item elements comprises:
determining a plurality of vectors spanning from the position of the visual content item element to respective positions of the group of visual content item elements; and determining a plurality of angles defined by pairs of the plurality of vectors.

5. A system as claim 4 recites, wherein split functions for each node of the plurality of nodes determine the flow of the visual content item element through the arrangement of the plurality of nodes based at least in part on an angle of the plurality of angles.

6. A system as claim 1 recites, further comprising:
a projecting device to project the reference light pattern onto the object; and
a visual content item capturing device to capture the visual content item comprising the plurality of visual content item elements representing the reference light pattern projected onto the object.

7. A computer-implemented method, the method comprising:
receiving a visual content item from a visual content item capturing device, the visual content item comprising a plurality of pixels representing a reference light pattern projected onto an object;
identifying a first pixel from the plurality of pixels;
determining a position of the first pixel relative to a first group of pixels of the plurality of pixels;
inputting the first pixel into a first classifier, the first classifier being trained using machine-learning techniques to determine disparities for individual pixels of the plurality of pixels based on changes in a position of the plurality of pixels, wherein the first classifier includes an arrangement of nodes for the plurality of pixels to move through, the nodes each comprising a split function for determining a next node for the plurality of pixels to flow to in the arrangement of nodes to reach leaf nodes; and
determining, based at least in part on executing the first classifier, a disparity for the first pixel based at least in part on the position of the first pixel relative to the first group of pixels.

8. A computer-implemented method as claim 7 recites, wherein identifying the first pixel from the plurality of pixels comprises:
scanning a scanline of the visual content item;
identifying a patch of the visual content item located along the scanline, the patch comprising the first pixel and the first group of pixels; and
identifying the first pixel based at least in part on the first pixel being located substantially in a center of the patch.

9. A computer-implemented method as claim 8 recites, wherein identifying the patch of the visual content item located along the scanline comprises identifying a structure of the first group of pixels corresponding to a known pixel structure associated with the visual content item depicting the reference light pattern based at least in part on features of the pixels.

10. A computer-implemented method as claim 7 recites, further comprising:
inputting a second pixel into a second classifier; and
determining, based at least in part on executing the second classifier, a disparity for the second pixel based at least in part on the position of the second pixel relative to a second group of pixels, wherein the first classifier is executed in parallel with the second classifier.

11. A computer-implemented method as claim 10 recites, wherein the first classifier is associated with a first scanline and the second classifier is associated with a second scanline.

12. A computer-implemented method as claim 7 recites, wherein the first classifier comprises a decision forest comprising the arrangement of nodes for the plurality of pixels to move through, the arrangement being a cascading arrangement, and the leaf nodes corresponding to labels associated with disparities for the plurality of pixels.

13. A computer-implemented method as claim 12 recites, wherein:
the labels are further divided into sublabels corresponding to subpixel disparities; and
the computer-implemented method further comprises determining, based at least in part on executing a regression algorithm, the disparity for the first pixel based at least in part on the position of subpixels of the first pixel.

14. A computer-implemented method as claim 7 recites, further comprising:
determining whether the disparity determined for the first pixel satisfies criteria; and
based at least in part on determining that the disparity determined for the first pixel does not satisfy the criteria, invalidating the disparity determined for the first pixel.

15. A computer-implemented method as claim 7 recites, further comprising:
determining whether the disparity determined for the first pixel satisfies criteria; and
based at least in part on determining that the disparity determined for the first pixel satisfies the criteria, calculating depth for a portion of the visual content item associated with the first pixel based at least in part on the disparity for the first pixel.

16. One or more computer storage media storing computer-executable instructions that, when executed by one or more processors, configure the one or more processors to perform operations comprising:
obtaining training data for training decision trees, the training data comprising pixels obtained from a plurality of training visual content items, each pixel of the pixels being associated with a ground truth disparity of a plurality of ground truth disparities; and
training, by executing one or more machine-learning algorithms, a first decision tree using the training data, the first decision tree comprising a root, a plurality of nodes arranged in a cascading formation, and a plurality of leaf nodes disposed at an end of the cascading formation of the plurality of nodes opposite the root, each node of the plurality of nodes comprising a split function to determine a next node of the plurality of nodes for the pixels to flow to, the training comprising:
selecting candidate split function parameters for each node of the plurality of nodes;
inputting the training data at the root of the first decision tree;
causing the training data to move through the plurality of nodes such that split functions corresponding to individual nodes of the nodes evaluate the training data based at least in part on the candidate split function parameters, the split functions causing the training data to recursively partition into successively smaller groups of training data; and
determining, by executing an objective function, optimal split function parameters for each of the plurality of nodes based at least in part on the training data moving through the plurality of nodes.

17. One or more computer storage media as claim 16 recites, the operations further comprising:

obtaining the plurality of training visual content items, the plurality of training visual content items being captured by a visual content item capturing device;

executing a stereo matching algorithm to compute disparity maps for each of the training visual content items; and determining the ground truth disparities for pixels contained in the training visual content items based at least in part on the disparity maps.

18. One or more computer storage media as claim 16 recites, wherein:

the plurality of training visual content items are captured by a first visual content item capturing device; and the operations further comprise:

determining intrinsic parameters of the first visual content item capturing device;

determining intrinsic parameters of a second visual content item capturing device;

calculating differences between the intrinsic parameters of the first visual content item capturing device and the intrinsic parameters of the second visual content item capturing device; and modifying the first decision tree based at least in part on the differences to create a second decision tree associated with the second visual content item capturing device.

19. One or more computer storage media as claim 16 recites, wherein the candidate split function parameters comprise threshold angles defined by pairs of vectors, each pair of vectors of the pairs of vectors comprising a first vector spanning from a first pixel to a second pixel and a second vector spanning from the first pixel to a third pixel.

20. One or more computer storage media as claim 16 recites, the training further comprising utilizing a regression algorithm to train the plurality of leaf nodes to map the pixels to disparity sublabels based at least in part on shifts of subpixels of the pixels.

* * * * *